United States Patent [19]
Zuniga

[11] Patent Number: 5,280,367
[45] Date of Patent: Jan. 18, 1994

[54] AUTOMATIC SEPARATION OF TEXT FROM BACKGROUND IN SCANNED IMAGES OF COMPLEX DOCUMENTS

[75] Inventor: Oscar A. Zuniga, Ft. Collins, Colo.

[73] Assignee: Hewlett-Packard Company, Palo Alto, Calif.

[21] Appl. No.: 705,838

[22] Filed: May 28, 1991

[51] Int. Cl.$^5$ .................. H04N 1/38; H04N 1/40; H04N 1/415; G06K 9/34

[52] U.S. Cl. .................. 358/462; 358/464; 358/466; 358/433; 382/9; 382/18

[58] Field of Search .......... 382/51, 18, 9; 358/462, 358/464, 465, 466, 455, 456, 458, 75, 433, 475

[56] References Cited

U.S. PATENT DOCUMENTS

| | | | |
|---|---|---|---|
| 4,447,830 | 4/1984 | Stoffel | 358/462 |
| 4,554,593 | 11/1985 | Fox et al. | 358/464 |
| 4,903,145 | 2/1990 | Funada | 358/462 |

OTHER PUBLICATIONS

Chow, C. K. and Kaneko, T., "Automatic Boundary Detection of the Left Ventricle from Cineangiograms", *Computers and Biomedical Research*, vol. 5, pp. 388–410, 1972.

*Primary Examiner*—Edward L. Coles, Sr.
*Assistant Examiner*—Rafael Bacares

[57] ABSTRACT

A system that converts a scanned image of a complex document into an image where text has been preserved and separated from the background. The system first subdivides the scanned image into blocks and then examines each block pixel by pixel to construct a histogram of the gray scale values of the pixels. The histogram is partitioned into a first, middle and last regions. If one or more peaks occur in the first and last regions, and a single histogram peak occurs within the middle region, the pixels are reexamined to determine the frequency of occurrence of pixels having a gray scale level of the middle peak nearby pixels which have a level of a first region peak. If this frequency is high, the middle peak is assumed to be background information. After determining the threshold, the system rescans the block applying the threshold to separate the text from background information within the block.

15 Claims, 12 Drawing Sheets

AUTOMATIC SEPARATION OF TEXT FROM BACKGROUND IN SCANNED IMAGES OF COMPLEX DOCUMENTS

FIELD OF THE INVENTION

This invention relates to computer systems and more particularly to document scanners within such systems. Even more particularly, the invention relates to separating text from background information in a scanned image of a document.

BACKGROUND OF THE INVENTION

Optical character recognition, or OCR, is the process of transforming a graphical bit image of a page of textual information into a text file wherein the text information is stored in a common computer processable format, such as ASCII. The text file can then be edited using standard word processing software.

When a document is being scanned, the brightness of each dot, or pixel, within the image of the document is stored as a code that represents the tonal range of the pixel. When using a monochromatic scanner, the tonal range varies from pure black to pure white along a gray scale. The code, or gray scale level, is typically four bits, giving a tonal range of 0 to 15, where 0 is typically pure black and 15 is typically pure white. Since each pixel is stored as a gray scale level, the scanner must determine the threshold gray scale level that separates textual information, which is typically toward the lower, black, end of the gray scale, from background information, which is typically toward the higher, white, end of the gray scale.

Prior art devices have created a histogram of the gray scale levels of the pixels within a document, and used peaks found in the histogram to perform the separation. This method works well with simple documents, which typically have black text printed on a white background. Scanning this type of document results in a histogram having two peaks, one representing the text at the lower end of the gray scale, and one representing the background at the higher end of the gray scale. The gray level threshold that separates text from background would be set at the valley between the two peaks.

When the document is more complex, however, this method breaks down. For example if part of the document has dark text on a light background, and part of the document has dark text on a colored background, the histogram may have three peaks, with the middle peak representing the colored background. Alternatively, if the document has dark text on a light background, and also has lighter text on a light background, the document will also have three peaks, with the middle peak representing the lighter text, not background.

A third situation occurs when the text is formed of characters with very thin lines. In this instance, only one peak may occur in the histogram, and this peak will represent the background color only.

There is a need in the art then for a scanning system that can separate text from background in complex documents. There is further need for such a system that can separate text printed on two or more background colors. A still further need is for such a system that will separate text formed from thin lines. The present invention meets these needs.

SUMMARY OF THE INVENTION

It is an aspect of the present invention to provide a system for separating text information from background information in a scanned image of a document.

It is another aspect of the invention to subdivide the image into blocks and perform such separation on each block.

Another aspect is to separate text on documents having multicolored backgrounds.

A further aspect of the invention is to perform such separation using a histogram of the gray scale levels of the scanned image.

A still further aspect of the invention is to improve legibility of text in complex documents being sent through facsimile machines.

The above and other aspects of the invention are accomplished in a system that converts a scanned image of a complex document, wherein each pixel is represented by a gray scale level, into a bilevel image where text has been preserved and separated from the background with minimum distortion. The system first subdivides the scanned image into blocks, for example, square block of 200 pixels on each side.

Each block is then examined pixel by pixel and a histogram is constructed of the gray scale levels of all the pixels. The histogram is then partitioned into three regions, which may be equally sized, wherein the region corresponding to the darkest information contained within the pixels is very likely to be black text, the region representing the lightest information on the gray scale is likely to be the background information, and wherein the third, or middle region may be either text or background. The system then determines a gray scale level threshold based on the information within the three regions of the gray scale. After determining the threshold, the system rescans the block applying the threshold to separate the text from background information within the block.

In determining the gray scale level threshold, if histogram peaks occur only in the text and background regions of the histogram, the threshold is set at the valley in between the two peaks. If a peak occurs within the unknown middle region, the pixels within the block are reexamined to determine the frequency of occurrence of pixels having a value corresponding to the peak within the middle region nearby pixels which have a value corresponding to the peak within the text region. If this frequency is sufficiently high, the ambiguous peak is assumed to be background information.

When setting the threshold to the valley between the text and background peaks, the system analyzes the histogram to set the threshold closer to the background peak, in order to more easily capture text having thin lines.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
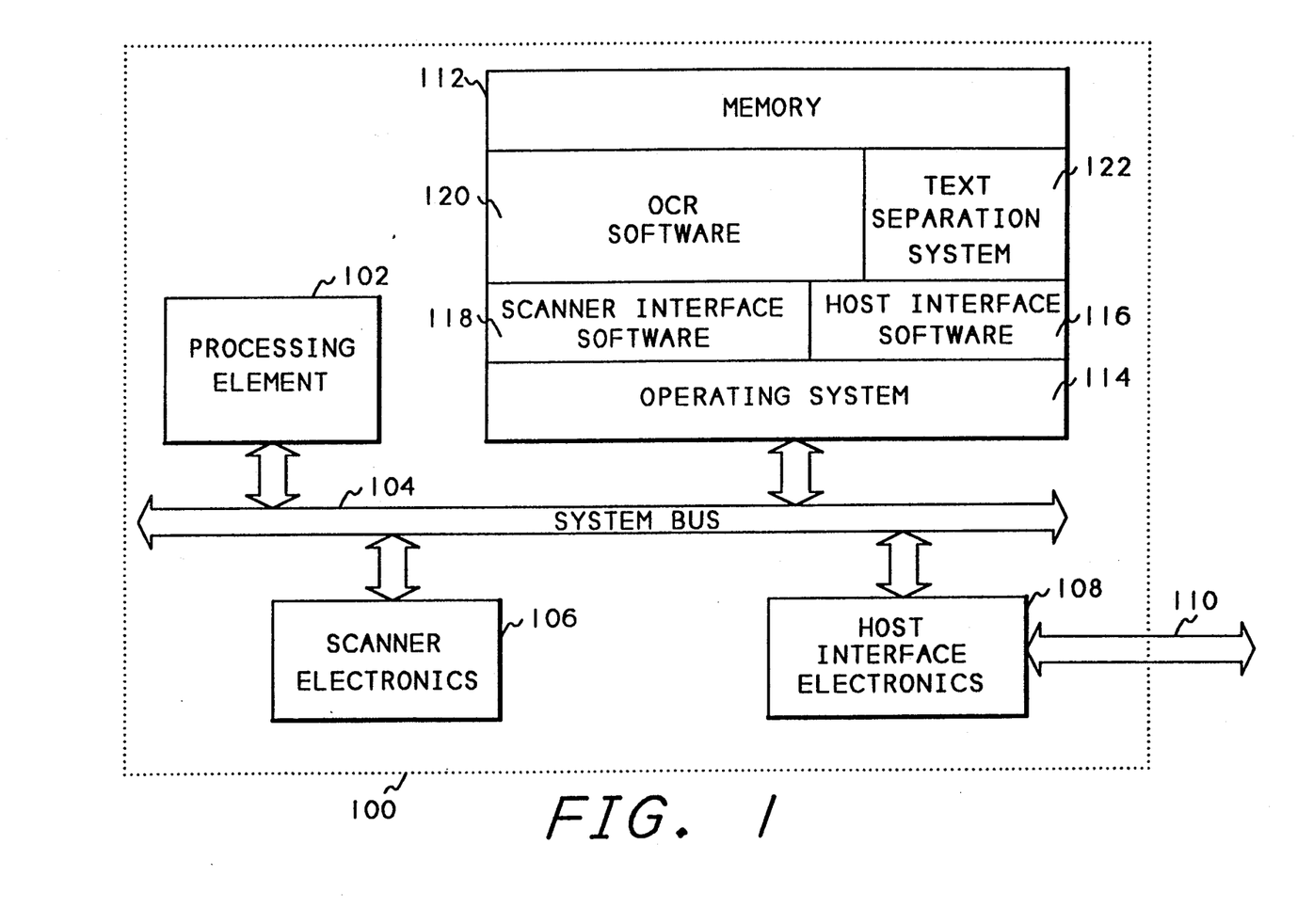
FIG. 1 shows a block diagram of a scanner device incorporating the present invention.

FIG. 1 shows a block diagram of a scanner device incorporating the present invention. Referring now to FIG. 1, a scanner device 100 contains a processing element 102 which communicates to other elements of the scanner 100 over a system bus 104. Scanner electronics 106 scan a document and produce a gray scale level for each pixel scanned. In the present invention the gray scale level consists of 16 possible levels with zero being pure black and 15 being pure white. The invention is not limited to 15 gray scale levels, however, it can be used with a system having any number of gray scale levels representing each pixel. Host interface electronics 108 communicate to a host computer system (not shown), over a host system bus 110. A memory 112 contains the software within the scanner, including the software of the present invention. Within the memory 112, an operating system 114 provides the lowest level software interface to the scanner electronics 106 and the host interface electronics 108. Scanner interface software 118 provides the next level of interface to the scanner electronics 106, and the OCR software 120 and text separation system 122 of the present invention provide the highest level interface to the scanner electronics 106. Host software interface 116 provides the software necessary to communicate to the host computer system (not shown) through the operating system 114 and the host interface electronics 108.

The scanner 100 containing the present invention is designed to electronically scan a document to produce a bit image of each pixel on the document, and then convert the text contained on the document into a computer readable form. The OCR software 120 is designed to convert the scanned image of text into the computer readable form of the text, however, before the OCR software 120 can perform this conversion the image must first be separated from its background. The separation of the image from background information is the function of the text separation system 122 of the present invention.

Figure 2:
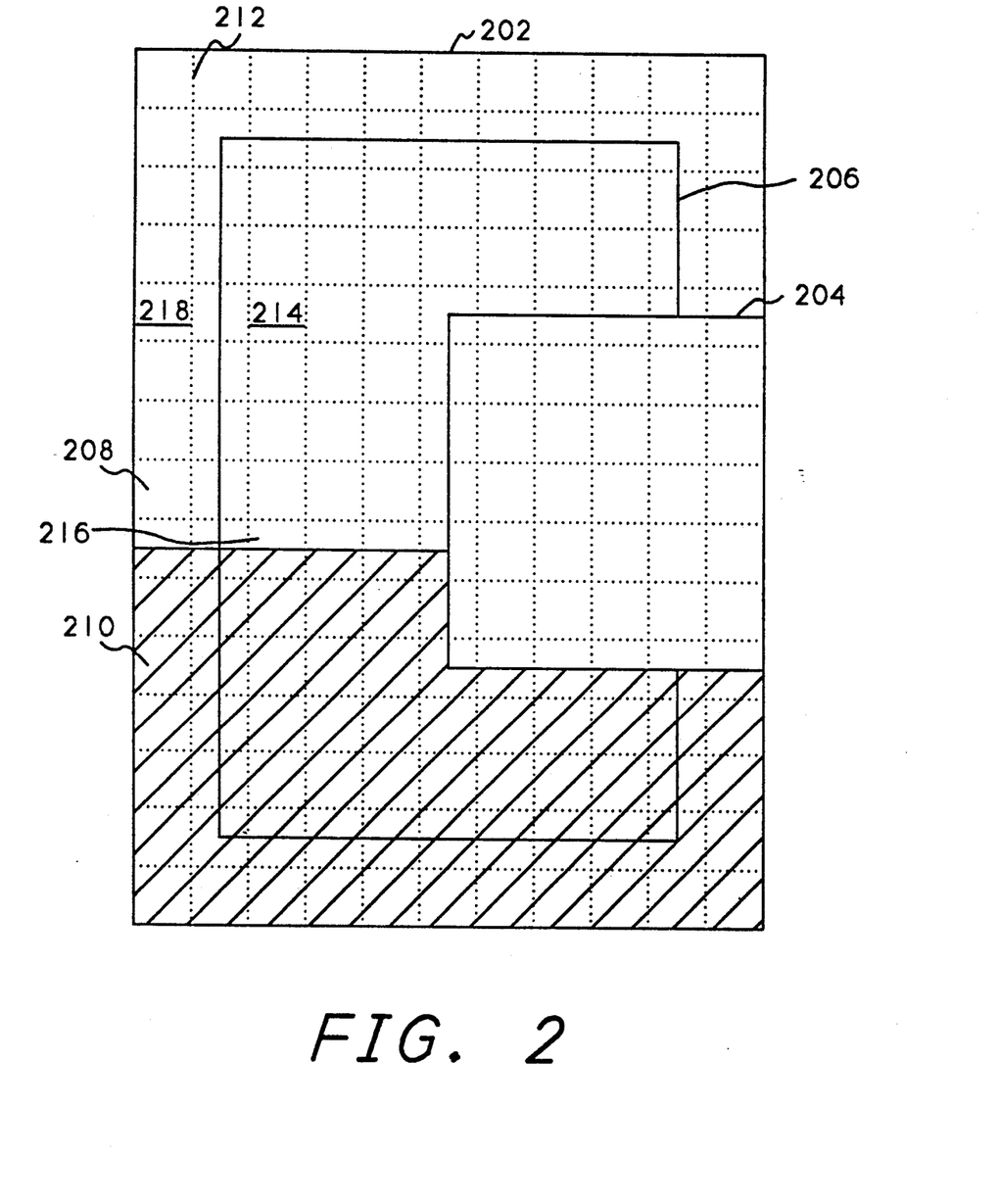
FIG. 2 shows an example of a document to be scanned.

FIG. 2 shows an example of a document to be scanned, and illustrates how the present invention would break the document into scannable blocks. Referring now to FIG. 2, a document 202 might, for example, contain a picture, here surrounded by line 204, as well as a text area, here surrounded by line 206. Within the text area 206, the document might, for example, have text on a white background 208, or the text might, for example, be printed on a background 210 having a different color. The purpose of the present invention is to separate text from the background, regardless of whether the background is white or of another color. A grid formed by dotted lines 212 shows how the invention breaks the document into a series of blocks before scanning each block to separate the text from its background. By sub-dividing the document into blocks, the background and text can be more easily separated. In the preferred embodiment of the present invention, which scans the document with a resolution of 300 pixels per inch, a block is typically 200 pixels square. The invention is not limited to blocks of this size, however, and could be used with blocks of any size, including a full page scan of the document.

Figure 3:
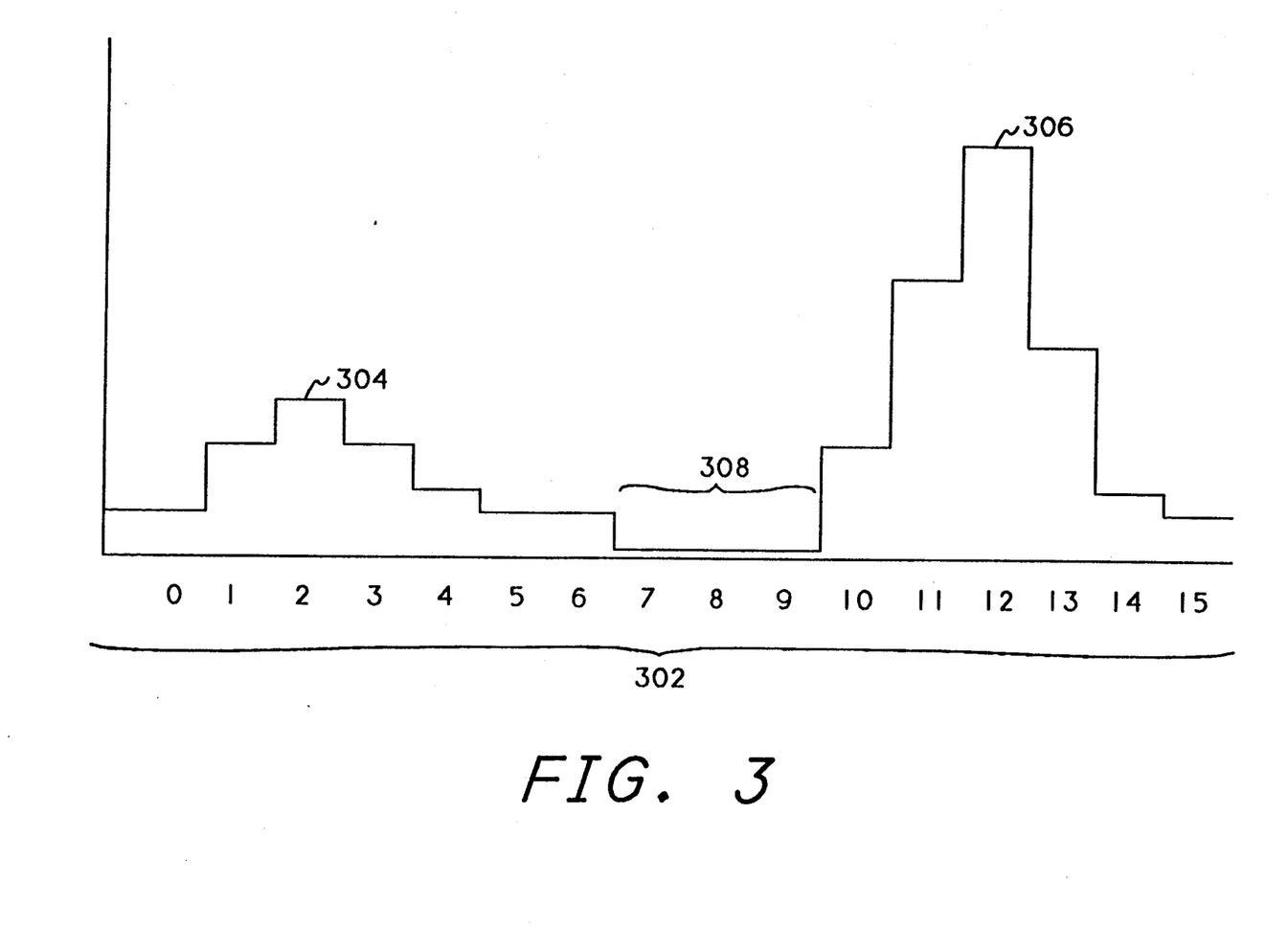
FIG. 3 shows a histogram of a scanned block having text on a single color background.

FIG. 3 shows a histogram created from a scanned block having text on a single color background, as, for example, might be illustrated by block 214 (FIG. 2). Referring now to FIG. 3, the histogram shows gray scale levels along the X axis and has one position for each of the 16 gray scale levels that are obtained when a block is scanned. The Y axis represents the number of pixels having the gray scale level. The histogram of FIG. 3 shows two peaks 304 and 306. The peak 304 would typically represent the text within the block 214 (FIG. 2), and the peak 306 would typically represent the white background color behind the text. In the histogram of FIG. 3, the best location for setting the threshold for separating text from background, would be any of the gray scale levels 7, 8, or 9 on the X axis 302. When a histogram having two peaks, as illustrated in FIG. 3, is detected by the system of the present invention, the system typically sets the threshold to the valley in between the two peaks, here illustrated by valley 308.

Figure 4:
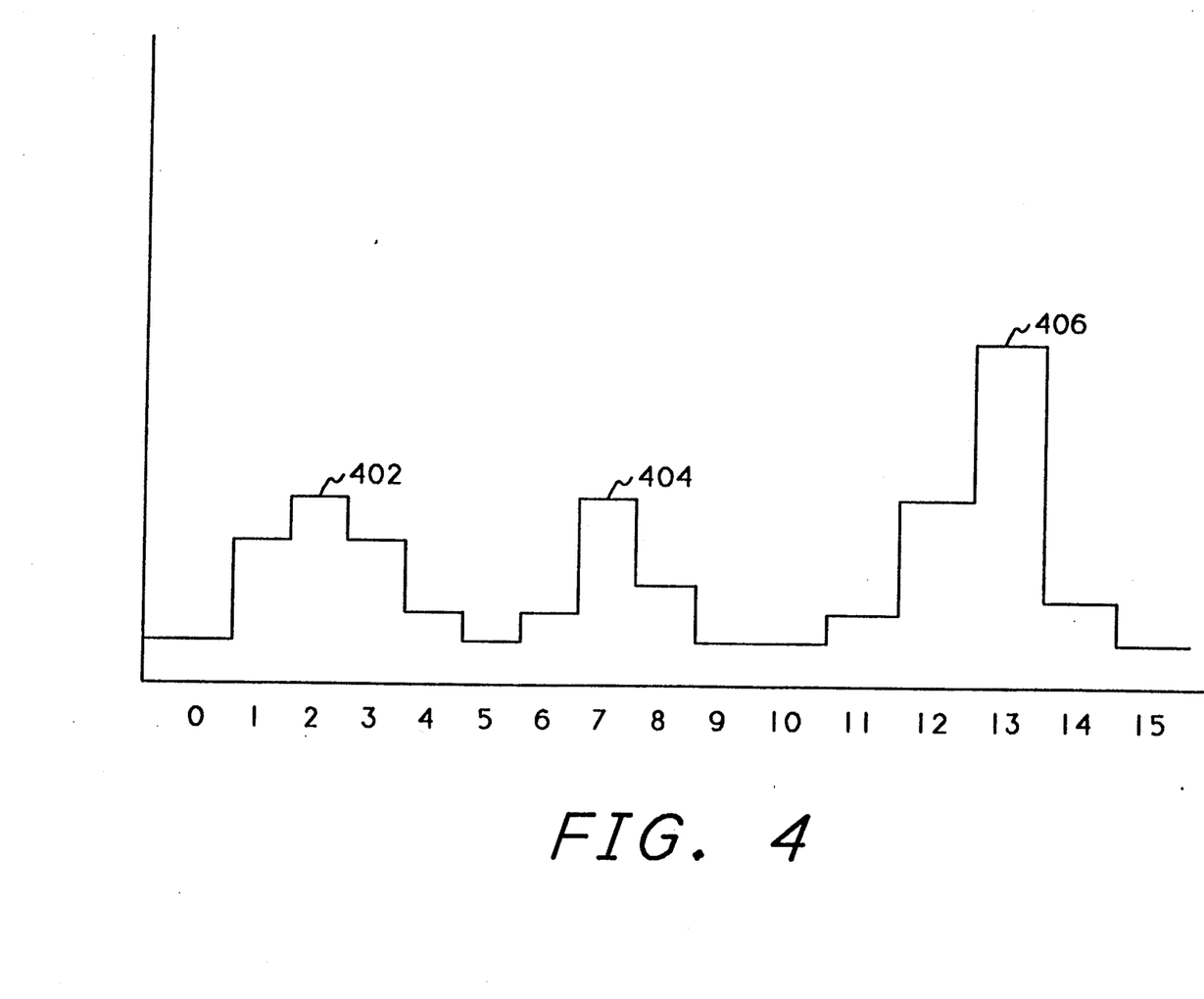
FIG. 4 shows a histogram of a scanned block having text on multiple background colors.

FIG. 4 shows a histogram of a scanned block of text on multiple background colors, such as, for example, block 216 (FIG. 2). Because the text is printed on two different background colors, the histogram shows three peaks, peak 402 for the text, peak 404 for the color background, and peak 406 for the white background behind the text. This same histogram could also represent two colors of text printed on a light background. When a histogram has three peaks, as illustrated in FIG. 4, the system of the present invention, as will be described below, will determine whether the middle peak 404 represents background or text.

Figure 5:
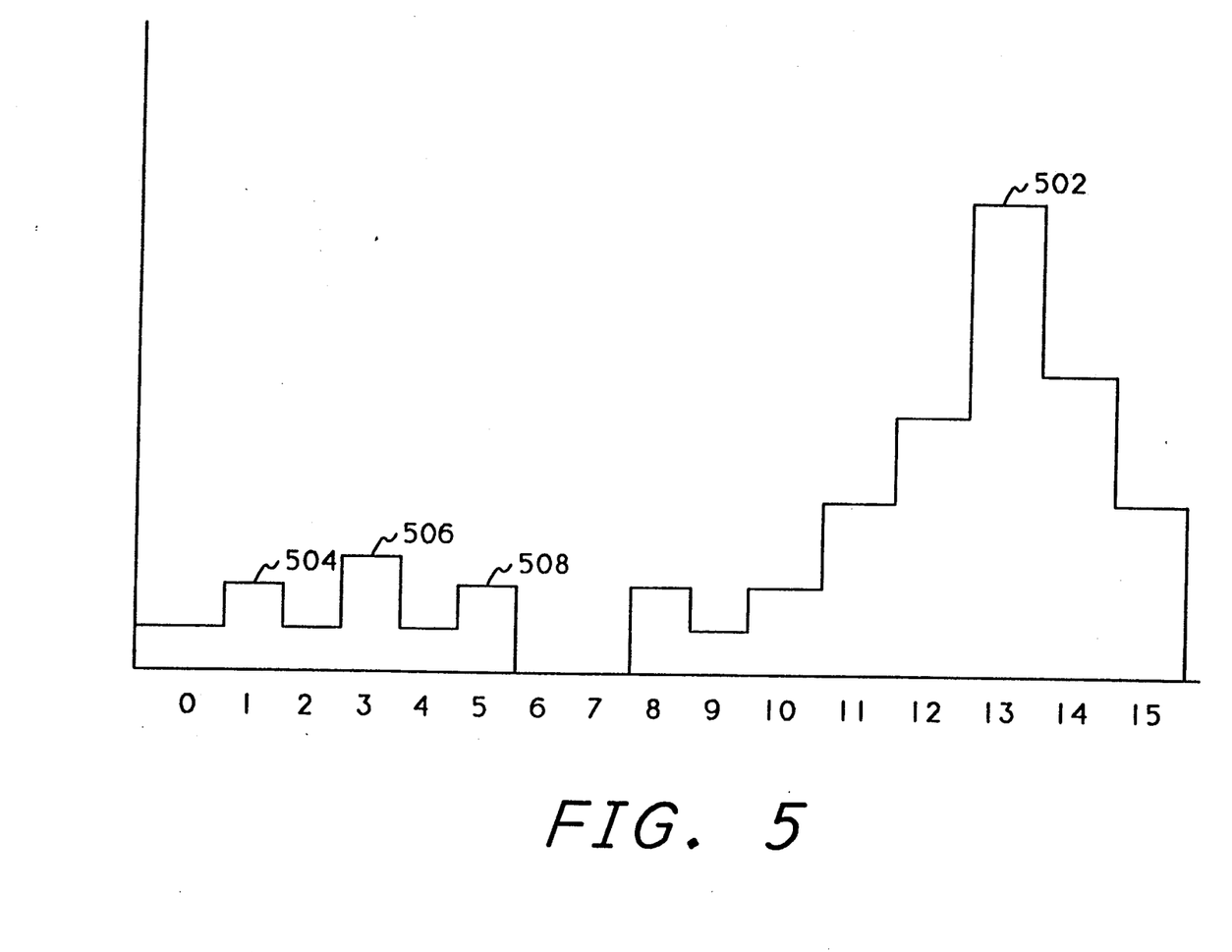
FIG. 5 shows a histogram of a scanned block having very light text.

FIG. 5 shows a histogram of a scan block having either very light text or no text, as for example block 218 (FIG. 2). Referring now to FIG. 5, peak 502 would typically represent the background color within the block, and the small peaks 504, 506 and 508 might represent very light text or might represent text showing through from the back of the document.

Figure 6:
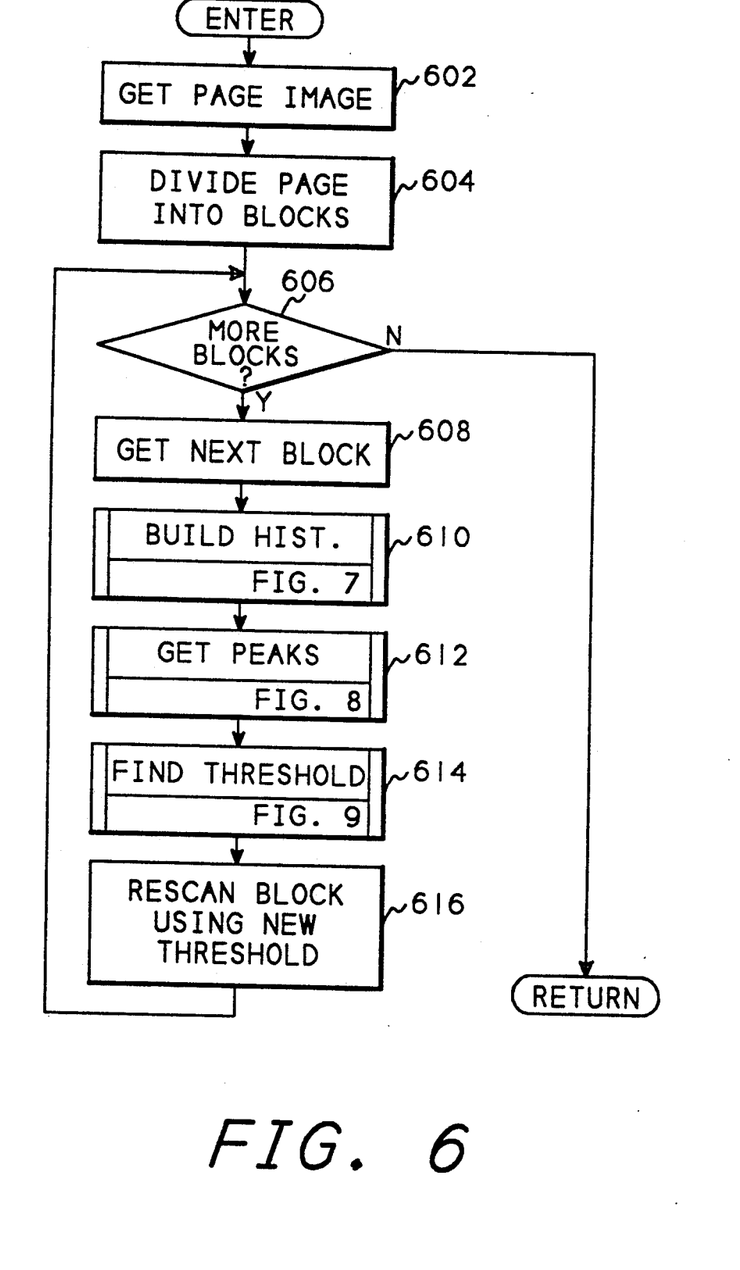
FIG. 6 shows a flowchart of the top level software module of the present invention.

FIG. 6 shows a flow chart of the top level software module of the present invention. This flowchart would be called by the OCR software 120 (FIG. 1). Referring now to FIG. 6, after entry, flowchart symbol 602 gets the scan page image by calling the scanner interface software 118 (FIG. 1) which in turn calls the operating system 114 which interfaces to the scanner electronics 106. As described above, in the preferred embodiment the document will be scanned at a resolution of 300 dots or pixels per inch, and each pixel will be represented by a four bit gray scale level having values from zero to 15. After obtaining the page image, symbol 604 divides the page image into blocks of 200 pixels square. After dividing the image into blocks, the system scans each block individually and symbol 606 determines whether additional blocks on the page need to be scanned. If additional blocks remain to be scanned, symbol 606 transfers to symbol 608 which gets the next block of pixels from the page image. Symbol 610 then calls FIG. 7 to build a histogram of the data within the block, and then symbol 612 calls FIG. 8 to determine the peaks within the histogram. After determining the peaks, symbol 614 calls FIG. 9 to set the threshold gray scale level for separating the text from the background within this block. After obtaining the threshold level, symbol 616 rescans the block using the new threshold which separates the text from the background. After rescanning the block, symbol 616 transfers back to symbol 606 which determines whether there are additional blocks to be scanned. This loop continues until every block on the page has been scanned at which time symbol 606 returns to its caller.

Figure 7:
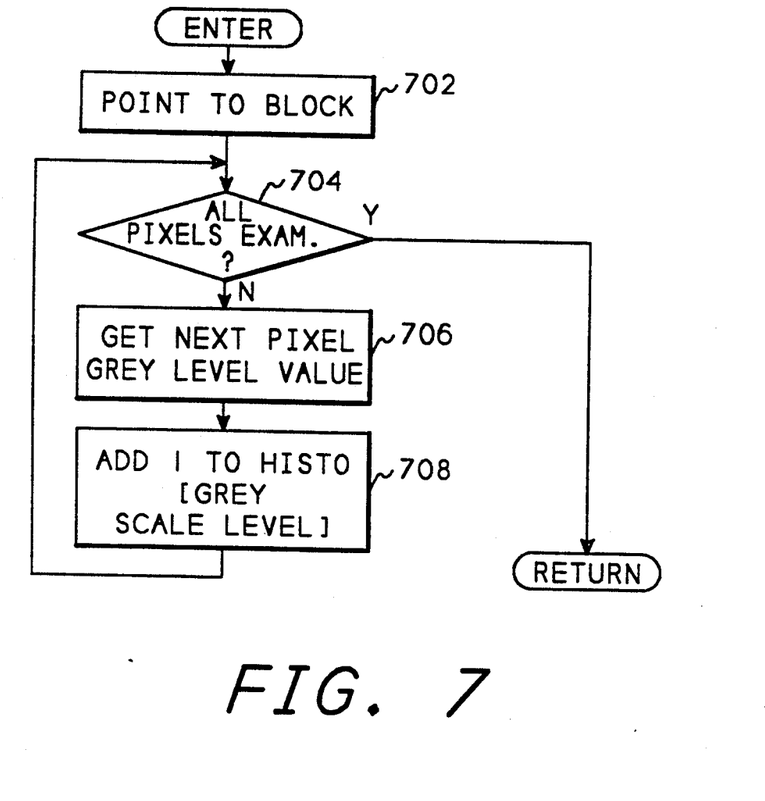
FIG. 7 shows a flowchart of the build histogram software module.

FIG. 7 shows a flow chart of the build histogram software module called by FIG. 6. Referring now to FIG. 7, after entry, symbol 702 points to the block of scanned data obtained by FIG. 6. Symbol 704 determines whether all pixels within the block have been examined and if not, symbol 704 transfers to symbol 706. Symbol 706 gets the gray scale level for the next pixel. Symbol 708 then adds one to a counter, within an array of counters called the HISTO array, which represents pixels having the gray scale level obtained by symbol 706. After adding one to the counter, symbol 708 transfers back to symbol 704 to get the next pixel. After all pixels have been examined within the block of data, symbol 704 returns to FIG. 6.

Figure 8:
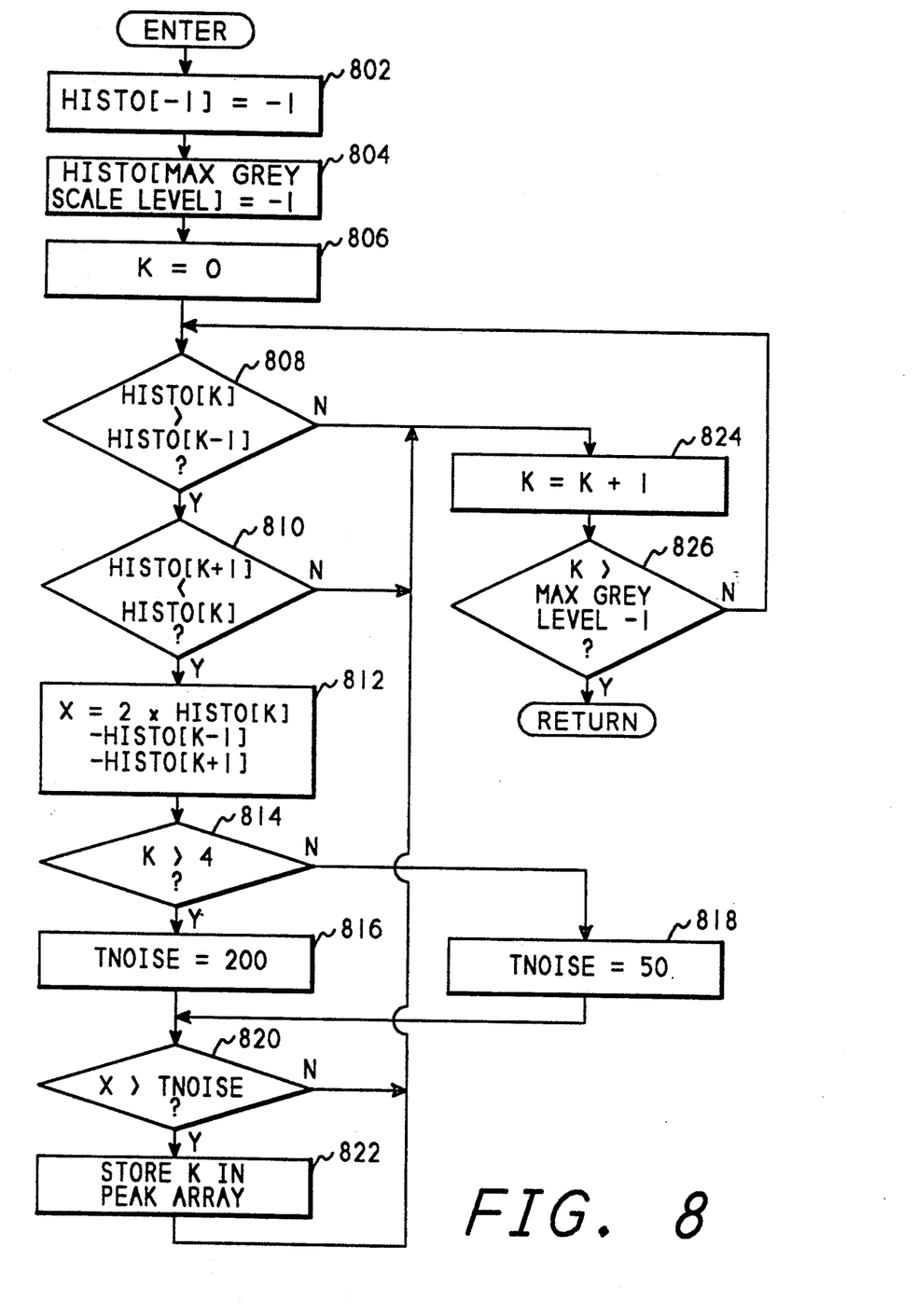
FIG. 8 shows a flowchart of the find histogram peaks software module.

FIG. 8 shows a flow chart of the find histogram peaks software module called from FIG. 6. Referring now to FIG. 8, after entry, symbol 802 sets the value of the −1 element of the histogram array, called HISTO, to a value of −1. Symbol 804 then sets the value of the maximum gray scale level number element of the HISTO array to −1. These two values are used to assess whether the end points, that is, array element zero and array element max gray scale level −1 are peaks. Symbol 806 then sets a variable K to zero.

The loop starting at symbol 808 will find any peaks within the histogram array. A peak is defined to occur at any local maxima of the histogram array. That is, there is a peak at an element of the array if the value stored at that element is higher than the value stored at the previous array element and is also higher than the value stored at the succeeding element. In order to filter out peaks due to noise, the peak will only be considered significant if the value of the peak is larger than either of the previous or succeeding values by a factor called TNOISE. TNOISE is a suitable "histogram noise" threshold which depends upon the number of pixels within the histogram. In the preferred embodiment, for histogram array elements zero through four, which would typically be the area that text would occur on the histogram, a noise value of 50 is used. For array elements greater than four, which will typically be background area of the histogram, a value of 200 is used for TNOISE.

After setting the value of K to 0, symbol 808 determines whether the K element within the histogram array is greater than the K−1 element within the array. If not, this element of the array cannot possibly contain a peak so control transfers to symbol 824 which increments the value of K and then symbol 826 determines whether all the elements within the histogram array have been examined. If elements remain to be examined, symbol 826 transfers back to symbol 808 to examine the next element within the histogram array.

If the value of the K element is greater than the value of the K−1 element, symbol 808 transfers to symbol 810 which determines whether the value of the K+1 element is less than the value of the K element. If not, symbol 810 transfers to symbol 824 to examine the next element. If the K+1 element is smaller than the K element, symbol 810 transfers to symbol 812 to determine whether this peak is larger than the noise factor. Symbol 812 computes the value of a variable X by multiplying the value of the K element of the histogram by 2 and then subtracting the value of the K−1 element and also subtracting the value of the K+1 element. Symbol 814 then examines K and if it is greater than 4, control transfers to symbol 816 which sets the value of TNOISE to 200. If K is less than or equal to 4, symbol 814 transfers to symbol 818 which sets TNOISE to 50. After setting TNOISE, control transfers to symbol 820 which compares the value of X to TNOISE. If X is less than TNOISE, the peak is not significant, so symbol 820 transfers to symbol 824 to examine the next element of the histogram array. If X is greater than TNOISE, symbol 820 transfers to symbol 822 which stores K in an array of peaks before transferring to symbol 824 to examine the next element of the histogram array. After all elements of the histogram array have been examined, symbol 826 returns control to FIG. 6.

Figure 9:
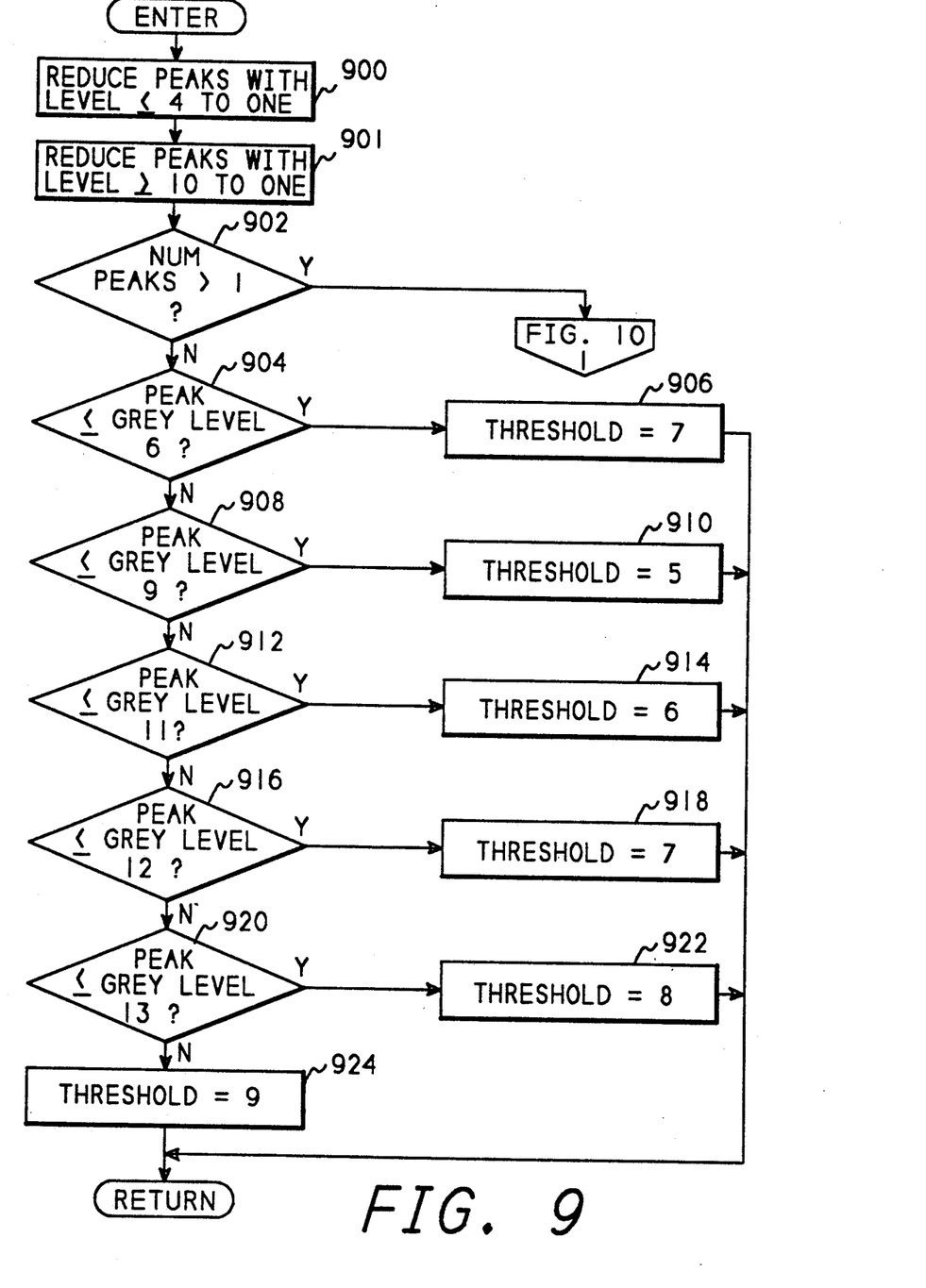
FIGS. 9 through 12 show a flowchart of the set threshold level software module.

FIGS. 9 through 12 show a flow chart of the set threshold software module called from FIG. 6. Referring now to FIG. 9, after entry, symbol 900 removes all peaks with a gray level less than or equal to 4 except for the peak with the highest gray level less than or equal to 4. Symbol 901 removes all the peaks with a gray level greater than or equal to 10 except for the peak with the lowest gray level greater than or equal to 10. Symbol 902 examines the number of peaks remaining in the histogram, and if this number is greater than 1, symbol 902 transfers to FIG. 10. If the number of peaks is 1 or less, symbol 902 transfers to symbol 904 which determines whether the gray scale level for the peak is less than . a level value of 6. If the peak gray scale level is less than or equal to 6, symbol 904 transfers to symbol 906 which sets the threshold gray scale level to a value of 7. If the peak is greater than 6, symbol 904 transfers to symbol 908 which determines whether the peak is less than or equal to a value of 9. If the peak is less than or equal to 9, symbol 908 transfers to symbol 910 which sets the threshold to 5. If the peak is greater than 9, symbol 908 transfers to symbol 912 which determines whether the peak is less than or equal to 11, and if it is, symbol 912 transfers to symbol 914 which sets the threshold to 6. If the peak is greater than 11, symbol 912 transfers to symbol 916 which determines whether the peak is equal to a gray scale level of 12, and if it is, transfers to symbol 918 which sets the threshold to 7. If the peak is greater than 12, symbol 916 transfers to symbol 920 which determines whether the peak is less than or equal to 13. If the peak is 13, symbol 920 transfers to symbol 922 which sets the threshold value to 8. If the peak is greater than 13, symbol 920 transfers to symbol 924 which sets the threshold value to 9. After setting the threshold value, FIG. 9 returns to FIG. 6.

Figure 10:
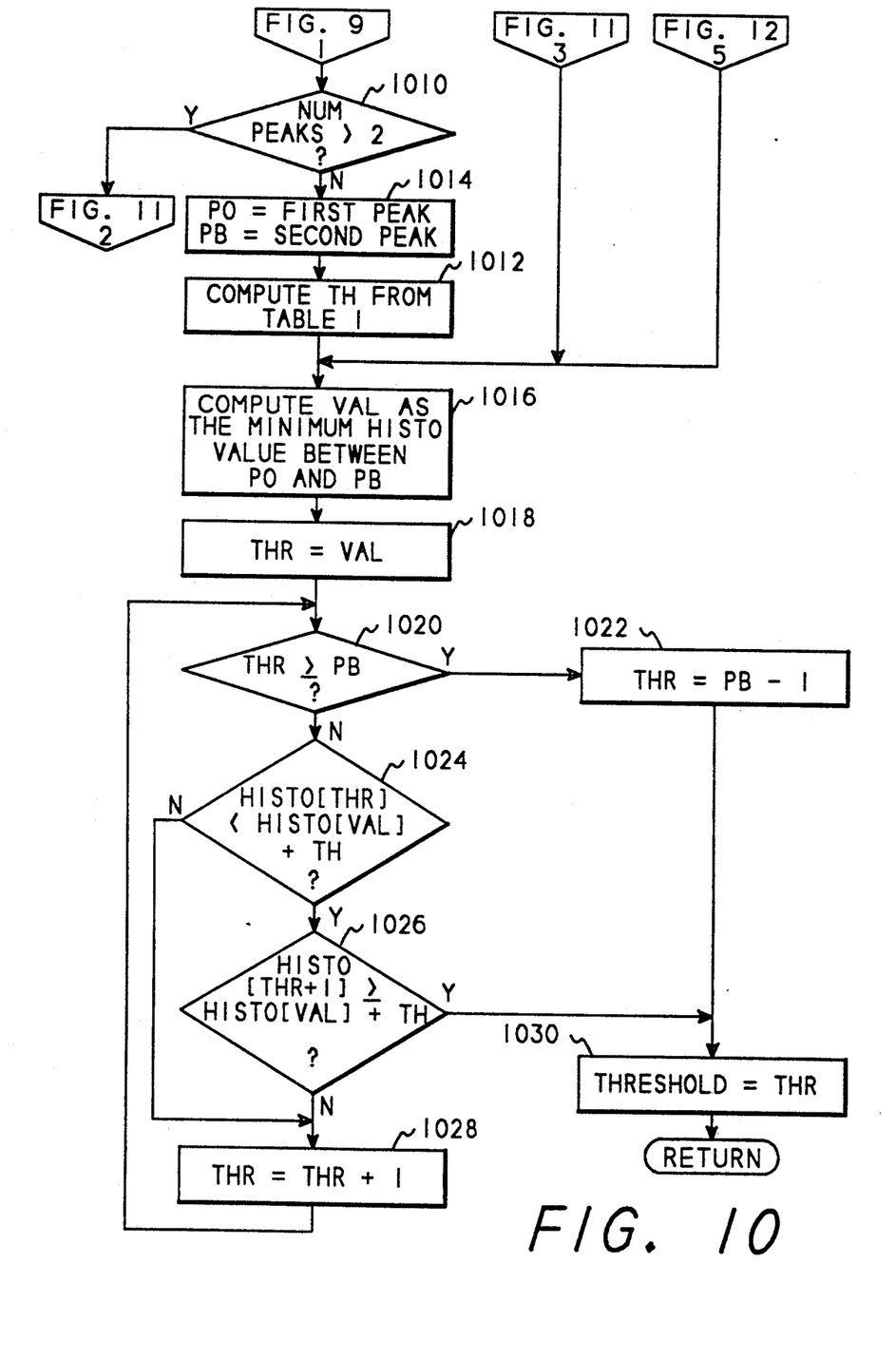

If the number of peaks was greater than 1, symbol 902 transfers to FIG. 10, symbol 1010. Symbol 1010 determines whether the number of peaks is greater than 2, and if it is, transfers control to FIG. 11. If the number of peaks is equal to 2, symbol 1010 transfers to symbol 1012 which sets the value of a variable PO to the first peak in the peaks array, and sets the value of a variable PB to the gray level value for the second peak. Symbol 1014 then computes the value of a variable TH from Table 1, based on the values of PO and PB set in symbol 1012. Symbol 1016 then examines the histogram array and sets the value of a variable VAL to the gray scale level for the minimum histogram element value between level PO and level PB. If more than one level between PO and PB is at the minimum value, the lowest gray scale level of these is used. Symbol 1018 then sets a variable THR equal to VAL. Symbol 1020 then determines whether THR is greater than or equal to PB. If it is, symbol 1020 transfers to symbol 1022 which sets the value THR to PB−1. Control then transfers to symbol 1030 which sets the threshold gray scale level equal to THR before returning to FIG. 6.

If THR is less than PB, symbol 1020 transfers to symbol 1024 which determines whether the value in the array element THR within the histogram array is less than the value in the array element VAL within the histogram, plus the value of TH. If this is true, symbol 1024 transfers to symbol 1026 which determines whether the value in the histogram array of element THR+1 is greater than or equal to the value in the array element VAL, plus the value of TH. If this is also true, symbol 1026 transfers to symbol 1030 which sets the threshold value to THR. If neither the tests in symbol 1024 nor 1026 are true, control transfers to symbol 1028 which increments the value of THR and returns to symbol 1024. This loop continues until the tests within symbols 1024 and 1026 are satisfied.

Figure 11:
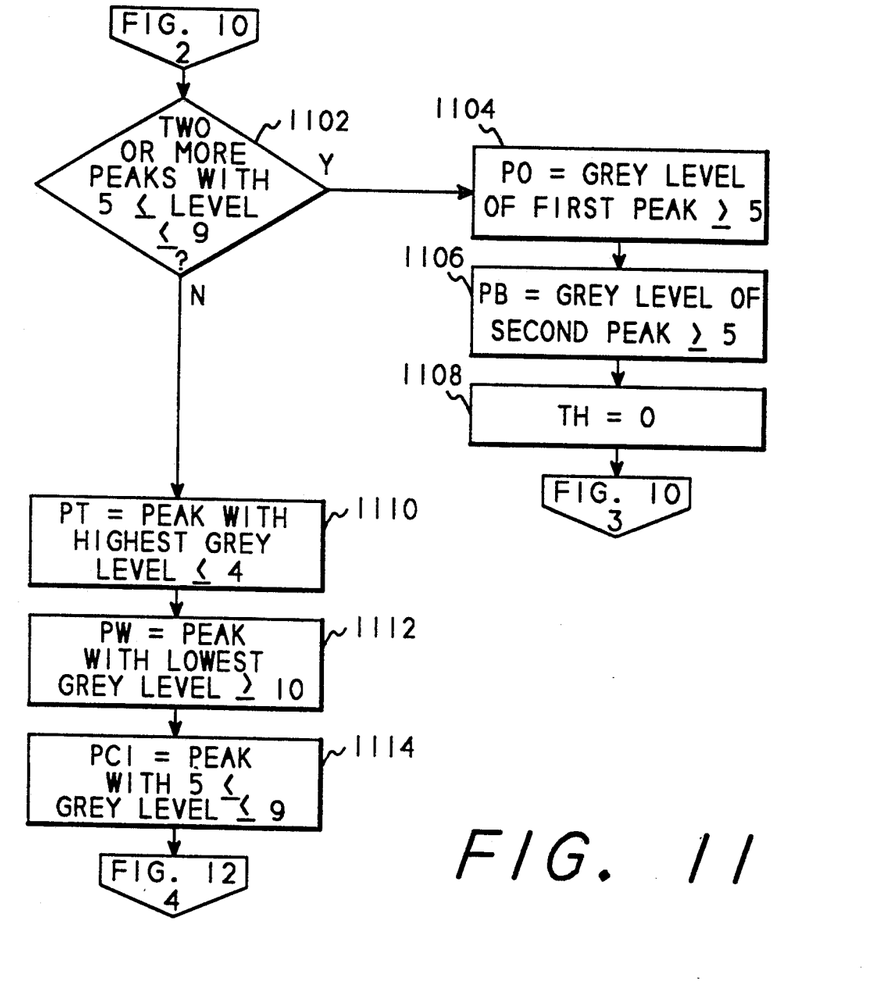

FIG. 11 is entered when there are more than two peaks in the histogram. After entry, symbol 1102 determines whether there are two or more peaks with a gray scale level between 5 and 9, that is, with a gray scale level indicating that the peak is in an unknown region of the histogram. If there are two or more peaks within the middle region of the histogram, the threshold will be set between the two left most peaks on the histogram. Therefore, to perform this threshold setting symbol 1102 transfers to symbol 1104 which sets the parameter PO to the gray level of the first peak in the histogram with a gray scale level greater than or equal to 5. Symbol 1106 then sets parameter PB to the gray scale level of the next peak greater than or equal to 5 beyond the first peak set in symbol 1104. Symbol 1108 then sets the value of TH to zero and transfers back to FIG. 1, symbol 1016, to set the threshold value.

If there is one or less peak in the gray scale range of 5 to 9, symbol 1102 transfers to symbol 1110 which sets a parameter PT equal to the peak with the highest gray level less than or equal to 4. If there are multiple peaks at a gray scale level less than or equal to 4, only the right most or highest gray scale level peak needs to be considered, since all other peaks are well within the text range. Symbol 1112 then sets a parameter PW equal to the peak with the lowest gray level greater than or equal to 10. If there are multiple peaks at a gray scale level higher than 10, they need not be considered since they are well within the background range of the gray scale. Symbol 1114 then sets a parameter PC1 equal to the peak with a gray scale level between 5 and 9. This peak is in an unknown area, and FIG. 12 will determine whether this peak represents background information or text information.

Figure 12:
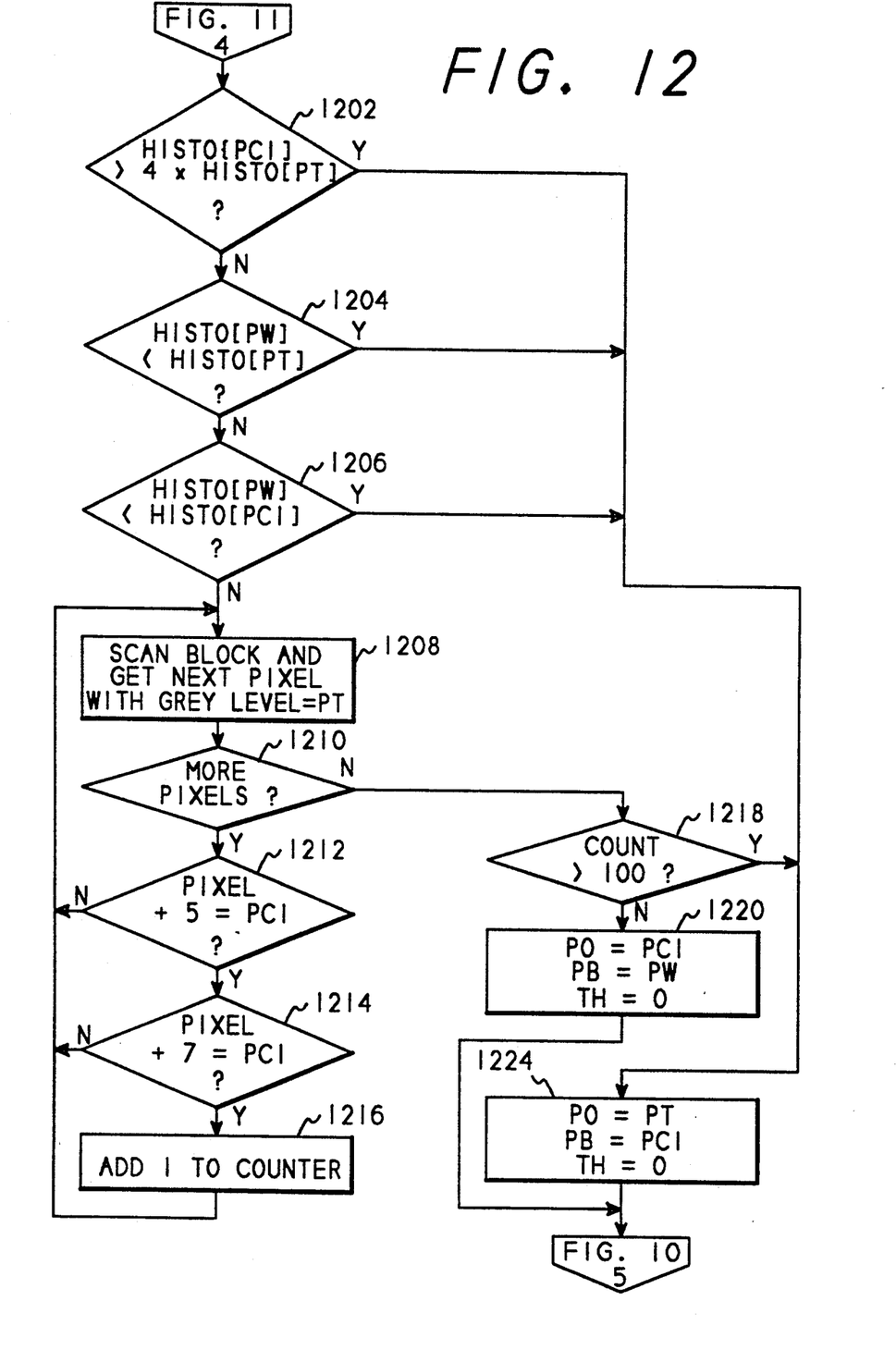

Control then transfers to FIG. 12, symbol 1202. Symbol 1202 determines whether the histogram value at PC1 is greater than 4 times the histogram value at PT, that is, is the unknown peak PC1 4 times higher than the known text peak. If this is true, then clearly PC1 is background information so symbol 1202 transfers to symbol 1224 which sets the values for parameters PO, PB and TH before returning to FIG. 10, symbol 1016, to set the threshold. If the peak at PC1 is not 4 times greater than the peak at PT, symbol 1202 transfers to symbol 1204 which determines whether the histogram value at the peak PW is less than the histogram value at the peak PT. If this is true, the unknown peak is clearly background so symbol 1204 transfers to symbol 1224. If this is not true, symbol 1204 transfers to symbol 1206 which determines whether the histogram value at peak PW is less than the histogram value at peak PC1. If this is true, the peak at PC1 is a background peak so symbol 1206 transfers to symbol 1224. If this is not true, then the system needs further information to determine whether the peak at PC1 is text or background information.

The data obtained with the following symbols will examine each pixel within the block that has a value equal to the gray scale level at peak PT and then examine pixels around it to determine whether they have the value of the gray scale level at peak PC1. If this turns out to be true, then PC1 is probably a background color since background would normally be adjacent to text. To obtain this information, symbol 1208 scans the block to find the next pixel with a gray scale level equal to the gray scale level at PT. Symbol 1210 then determines if a pixel was found and if a pixel was found, symbol 1210 transfers to symbol 1212. Symbol 1212 adds 5 to the pixel number of the pixel with the gray scale level equal to the gray scale level at PT and determines whether the gray scale level of this new pixel is equal to the gray scale level of PC1. If this is not true, symbol 1212 returns to symbol 1208 to examine the next pixel with a gray scale level equal to PT. If the pixel at +5 does have a value of PC1, symbol 1212 transfers to symbol 1214 which checks, as a safety measure, another pixel at the value of the gray scale level pixel PT+7 to determine if it has a value of PC1 and if this is true, symbol 1214 transfers to symbol 1216 which adds one to a counter. This second check is not necessary, but provide additional noise immunity. The value of this counter will be used to assess whether the peak at PC1 is background or text.

Control then transfers back to symbol 1208 to get the next pixel and after all pixels have been examined, symbol 1210 transfers to symbol 1218 which checks the count value accumulated in symbol 1216 to determine whether this count is greater than 100. 100 is used in the preferred embodiment because of the block size of 200 by 200 pixels. Those skilled in the art will recognize that if a different block size is chosen, then a different value would be necessary for the count. If the count is greater than 100, then the peak at PC1 is considered to be background information so symbol 1218 transfers to symbol 1224 which sets the values necessary to cause PC1 to be considered background. If the count is less than 100, symbol 1218 transfers to symbol 1220 which sets the values of PO, PB and TH to values which will cause the peak at PC1 to be considered text before returning to FIG. 10, symbol 1016, to set the threshold value.

Having thus described a presently preferred embodiment of the present invention, it will now be appreciated that the aspects of the invention have been fully achieved, and it will be understood by those skilled in the art that many changes in construction and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

TABLE 1

| PO | PB | TH |
|---|---|---|
|  | ≦11 | 0 |
| ≦1 | 12 | 0 |
| ≧2 | 12 | 50 |
| ≦1 | ≧13 | 100 |
| 2 | ≧13 | 200 |
| ≧3 | ≧13 | 100 |

What is claimed is:

1. A computer implemented process for separating text information from background information in a scanned electronic image of a document, said computer implemented process comprising the steps of:
   (a) electronically scanning the document to convert the document into said scanned electronic image of the document;
   (b) examining said scanned electronic image and dividing said scanned electronic image into a plurality of blocks;
   (c) constructing a histogram of gray scale values of pixels within one of said blocks;
   (d) dividing said histogram into three regions comprising a first region, a middle region and a last region;
   (d) determining a number of peaks of said histogram in each of said three regions;
   (f) if said histogram contains no peak in said middle region, setting a threshold gray scale level between a gray scale level of a peak having a highest gray scale level in said first region and a gray scale level of a peak having a lowest gray scale level in said last region;
   (g) separating said text information from said background information by reexamining said block using said threshold gray scale level set in step (f); and
   (h) repeating steps (c) through (g) for each of said plurality of blocks.

2. The computer implemented process of claim 1 wherein step (d) further comprises the step of dividing said histogram into three equal sized regions.

3. The computer implemented process of claim 1 wherein step (f) further comprises the steps of:
   (f1) if said histogram contains only a single peak in said middle region performing the steps of
      (f1a) selecting a peak having a highest gray scale level in said first region,
      (f1b) selecting each pixel in said block having a gray scale level equal to said gray scale level of said peak selected in step (f1a),
      (f1c) for each pixel selected in step (f1b), selecting a second pixel located a predetermined distance from said selected pixel,
      (f1d) if said second pixel has a gray scale level equal to a gray scale level of said single peak in said middle region, incrementing a counter,
      (f1e) if said counter has a count greater than a predetermined number, setting a threshold gray scale level to a gray scale level greater than said gray scale level of said single peak in said middle region, and
      (f1f) if said counter has a count less that said predetermined number, setting said threshold gray scale level to a gray scale level less than said gray scale level of said single peak in said middle region.

4. The computer implemented process of claim 1 wherein step (f) further comprises the steps of:
   (f2) if said histogram contains at least two peaks in said middle region, performing the steps of
      (f2a) selecting two peaks of said at least two peaks wherein said selected two peaks have a lowest and next lowest gray scale levels of said at least two peaks in said middle region, and
      (f2b) setting a threshold gray scale level between said gray scale levels of said two peaks selected in step (f2a).

5. The computer implemented process of claim 1 wherein step (e) further comprises the steps of:
   (e1) retrieving a histogram value for a first histogram gray scale level within a region;
   (e2) retrieving a histogram value for second histogram gray scale level within said region wherein said second histogram gray scale level is one level less that said gray scale level of said first histogram gray scale level;
   (e3) retrieving a histogram value for third histogram gray scale level within said region wherein said third histogram gray scale level is one level more that said gray scale level of said first histogram gray scale level;
   (e4) selecting said first histogram gray scale level as a peak if a difference between twice said first histogram value and a sum of said second histogram value and said third histogram value is greater than a predetermined noise value.

6. A computer implemented process for separating text information from background information in a scanned electronic image of a document, said computer implemented process comprising the steps of:
   (a) electronically scanning the document to convert the document into said scanned electronic image of the document;
   (b) examining said scanned electronic image and dividing said scanned electronic image into a plurality of blocks;
   (c) constructing a histogram of gray scale values of pixels within one of said blocks;
   (d) dividing said histogram into three regions, comprising a first region, a middle region and a last region;
   (e) locating all peaks in said histogram;
   (f) removing all except a highest peak in said first region;
   (g) removing all except a lowest peak in said last region;
   (h) determining a number of peaks remaining in said histogram;
   (i) if said histogram contains only two peaks, setting a threshold gray scale level between a gray scale level of a first peak and a gray scale level of a second peak;
   (j) separating said text information from said background information by reexamining said block using said threshold gray scale level set in step (i); and (k) repeating steps (c) through (j) for each of said plurality of blocks.

7. The computer implemented process of claim 6 wherein step (d) further comprises the step of dividing said histogram into three equal sized regions.

8. The computer implemented process of claim 6 wherein step (i) further comprises the steps of:
- (i1) if said histogram contains only a single peak in said middle region performing the steps of
  - (i1a) selecting a peak having a highest gray scale level in said first region,
  - (i1b) selecting each pixel in said block having a gray scale level equal to said gray scale level of said peak selected in step (i1a),
  - (i1c) for each pixel selected in step (i1b), selecting a second pixel located a predetermined distance from said selected pixel,
  - (i1d) if said second pixel has a gray scale level equal to a gray scale level of said single peak in said middle region, incrementing a counter,
  - (i1e) if said counter has a count greater than a predetermined number, setting a threshold gray scale level to a gray scale level greater than said gray scale level of said single peak in said middle region, and
  - (i1f) if said counter has a count less that said predetermined number, setting said threshold gray scale level to a gray scale level less than said gray scale level of said single peak in said middle region.

9. The computer implemented process of claim 6 wherein step (i) further comprises the steps of:
- (i2) if said histogram contains at least two peaks in said middle region, performing the steps of
  - (i2a) selecting two peaks of said at least two peaks wherein said selected two peaks have a lowest and next lowest gray scale levels of said at least two peaks in said middle region, and
  - (i2b) setting a threshold gray scale level between said gray scale levels of said two peaks selected in step (i2a).

10. The computer implemented process of claim 6 wherein step (e) further comprises the steps of:
- (e1) retrieving a histogram value for a first histogram gray scale level within a region;
- (e2) retrieving a histogram value for second histogram gray scale level within said region wherein said second histogram gray scale level is one level less that said gray scale level of said first histogram gray scale level;
- (e3) retrieving a histogram value for third histogram gray scale level within said region wherein said third histogram gray scale level is one level more that said gray scale level of said first histogram gray scale level;
- (e4) selecting said first histogram gray scale level as a peak in a difference between twice said first histogram value and a sum of said second histogram value and said third histogram value is greater than a predetermined noise value.

11. A computer implemented process for separating text information from background information in a scanned electronic image of a document, said computer implemented process comprising the steps of:

(a) electronically scanning the document to convert the document into said scanned electronic image of the document;

(b) examining said scanned electronic image and constructing a histogram of gray scale values of pixels within said scanned electronic image;

(c) dividing said histogram into three regions comprising a first region, a middle region and a last region;

(d) determining a number of peaks of said histogram in each of said three regions;

(e) if said histogram contains no peak in said middle region, setting a threshold gray scale level between a gray scale level of a peak having a highest gray scale level in said first region and a gray scale level of a peak having a lowest gray scale level in said last region;

(f) separating said text information from said background information by reexamining said scanned electronic image using said threshold gray scale level set in step (e).

12. The computer implemented process of claim 11 wherein step (c) further comprises the step of dividing said histogram into three equal sized regions.

13. The computer implemented process of claim 11 wherein step (e) further comprises the steps of:
- (e1) if said histogram contains only a single peak in said middle region performing the steps of
  - (e1a) selecting a peak having a highest gray scale level in said first region,
  - (e1b) selecting each pixel in said scanned electronic image having a gray scale level equal to said gray scale level of said peak selected in step (e1a),
  - (e1c) for each pixel selected in step (e1b), selecting a second pixel located a predetermined distance from said selected pixel,
  - (e1d) if said second pixel has a gray scale level equal to a gray scale level of said single peak in said middle region, incrementing a counter,
  - (e1e) if said counter has a count greater than a predetermined number, setting a threshold gray scale level to a gray scale level greater than said gray scale level of said single peak in said middle region, and
  - (e1f) if said counter has a count less that said predetermined number setting said threshold gray scale level to a gray scale level less than said gray scale level of said single peak in said middle region.

14. The computer implemented process of claim 11 wherein step (e) further comprises the steps of:
- (e2) if said histogram contains at least two peaks in said middle region, performing the steps of
  - (e2a) selecting two peaks of said at least two peaks wherein said selected two peaks have a lowest and next lowest gray scale levels of said at least two peaks in said middle region, and
  - (e2b) setting a threshold gray scale level between said gray scale levels of said two peaks selected in step (e2a).

15. The computer implemented process of claim 11 wherein step (d) further comprises the steps of:
- (d1) retrieving a histogram value for a first histogram gray scale level within a region;
- (d2) retrieving a histogram value for second histogram gray scale level within said region wherein said second histogram gray scale level is one level less that said gray scale level of said first histogram gray scale level;

(d3) retrieving a histogram value for third histogram gray scale level within said region wherein said third histogram gray scale level is one level more that said gray scale level of said first histogram gray scale level;

(d4) selecting said first histogram gray scale level as a peak if a difference between twice said first histogram value and a sum of said second histogram value and said third histogram value is greater than a predetermined noise value.

* * * * *